United States Patent
Chazono et al.

(10) Patent No.: US 6,673,461 B2
(45) Date of Patent: *Jan. 6, 2004

(54) MULTILAYER CERAMIC CAPACITOR AND METHOD FOR MANUFACTURING SAME

(75) Inventors: Hirokazu Chazono, Tokyo (JP); Hisamitsu Shizuno, Tokyo (JP); Hiroshi Kishi, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 301 days.

This patent is subject to a terminal disclaimer.

(21) Appl. No.: 09/823,157

(22) Filed: Mar. 30, 2001

(65) Prior Publication Data

US 2001/0036054 A1 Nov. 1, 2001

(30) Foreign Application Priority Data

Mar. 30, 2000 (JP) .......................... 2000-094532
Mar. 30, 2000 (JP) .......................... 2000-094536
Apr. 26, 2000 (JP) .......................... 2000-125289

(51) Int. Cl.⁷ ............................................. H01G 4/08
(52) U.S. Cl. ...................... 428/469; 428/697; 428/701; 428/702; 361/312; 361/314; 361/320; 361/321.1; 361/321.2; 361/321.5
(58) Field of Search .................... 428/469, 689, 428/697, 701, 702; 501/32; 361/311, 312, 313, 320, 321.1, 321.2, 321.5, 314

(56) References Cited

U.S. PATENT DOCUMENTS

| | | | | |
|---|---|---|---|---|
| 4,027,209 A | * | 5/1977 | Maher | 361/321.4 |
| 5,521,332 A | * | 5/1996 | Shikata et al. | 174/52.4 |
| 2001/0055193 A1 | * | 12/2001 | Chazono et al. | 361/311 |

FOREIGN PATENT DOCUMENTS

| | | | | |
|---|---|---|---|---|
| JP | 07029764 A | * | 1/1995 | H01G/4/10 |
| JP | 08228078 A | * | 9/1996 | H05K/3/46 |
| JP | 08295558 A | * | 11/1996 | C04B/35/16 |
| JP | 08298380 A | * | 11/1996 | H05K/3/46 |

* cited by examiner

Primary Examiner—Deborah Jones
Assistant Examiner—Stephen Stein
(74) Attorney, Agent, or Firm—Katten Muchin Zavis Rosenman

(57) ABSTRACT

A multilayer ceramic capacitor is formed by alternately stacking a plurality of dielectric layers and a multiplicity of internal electrodes, which are connected to a pair of external electrodes. Each of the dielectric layers is obtained from a dielectric ceramic compound composed of ceramic grains and a glass component connecting the ceramic grains, and the glass component contains one or more additive elements in a form of a solid solution. The additive elements are selected from the group consisting of Mn, V, Cr, Mo, Fe, Ni, Cu and Co.

11 Claims, 2 Drawing Sheets

FIG. 3

TABLE 1

| Sample No. | Mn | V | Cr | Mo | Fe | Ni | Cu | Co | Sc | Y | Gd | Dy | Ho | Er | Yb | Tm | Lu | Life | ε |
|---|---|---|---|---|---|---|---|---|---|---|---|---|---|---|---|---|---|---|---|
| *1 | 0 | 0 | 0 | 0 | 0 | 0 | 0 | 0 | 0 | 0 | 0 | 0 | 0 | 0 | 0 | 0 | 0 | 1 | 3400 |
| 2 | 0.01 | 0 | 0 | 0 | 0 | 0 | 0 | 0 | 0 | 0 | 0 | 0 | 0 | 0 | 0 | 0 | 0 | 1.4 | 3320 |
| 3 | 0.2 | 0 | 0 | 0 | 0 | 0 | 0 | 0 | 0 | 0 | 0 | 0 | 0 | 0 | 0 | 0 | 0 | 1.5 | 3250 |
| 4 | 0.8 | 0 | 0 | 0 | 0 | 0 | 0 | 0 | 0 | 0 | 0 | 0 | 0 | 0 | 0 | 0 | 0 | 1.9 | 3140 |
| 5 | 1 | 0 | 0 | 0 | 0 | 0 | 0 | 0 | 0 | 0 | 0 | 0 | 0 | 0 | 0 | 0 | 0 | 2.8 | 3080 |
| *6 | 1.2 | 0 | 0 | 0 | 0 | 0 | 0 | 0 | 0 | 0 | 0 | 0 | 0 | 0 | 0 | 0 | 0 | 3 | 2200 |
| 7 | 0 | 0.05 | 0 | 0 | 0 | 0 | 0 | 0 | 0 | 0 | 0 | 0 | 0 | 0 | 0 | 0 | 0 | 1.7 | 3240 |
| 8 | 0 | 0 | 0.05 | 0 | 0 | 0 | 0 | 0 | 0 | 0 | 0 | 0 | 0 | 0 | 0 | 0 | 0 | 1.8 | 3180 |
| 9 | 0 | 0 | 0 | 0.05 | 0 | 0 | 0 | 0 | 0 | 0 | 0 | 0 | 0 | 0 | 0 | 0 | 0 | 1.6 | 3220 |
| 10 | 0 | 0 | 0 | 0 | 0.05 | 0 | 0 | 0 | 0 | 0 | 0 | 0 | 0 | 0 | 0 | 0 | 0 | 1.5 | 3250 |
| 11 | 0 | 0 | 0 | 0 | 0 | 0.05 | 0 | 0 | 0 | 0 | 0 | 0 | 0 | 0 | 0 | 0 | 0 | 1.7 | 3190 |
| 12 | 0 | 0 | 0 | 0 | 0 | 0 | 0.05 | 0 | 0 | 0 | 0 | 0 | 0 | 0 | 0 | 0 | 0 | 1.6 | 3150 |
| 13 | 0 | 0 | 0 | 0 | 0 | 0 | 0 | 0.05 | 0 | 0 | 0 | 0 | 0 | 0 | 0 | 0 | 0 | 1.8 | 3210 |
| 14 | 0.1 | 0 | 0 | 0 | 0 | 0 | 0 | 0 | 0.5 | 0 | 0 | 0 | 0 | 0 | 0 | 0 | 0 | 1.8 | 3340 |
| 15 | | 0.1 | 0 | 0 | 0 | 0 | 0 | 0 | 0 | 0.5 | 0 | 0 | 0 | 0 | 0 | 0 | 0 | 1.9 | 3320 |
| 16 | 0 | 0 | 0.1 | 0 | 0 | 0 | 0 | 0 | 0 | 0 | 1 | 0 | 0 | 0 | 0 | 0 | 0 | 2.2 | 3280 |
| 17 | 0 | 0 | 0 | 0.1 | 0 | 0 | 0.1 | 0 | 0 | 0 | 0 | 1 | 0 | 0 | 0 | 0 | 0 | 2.1 | 3290 |
| 18 | 0 | 0 | 0 | 0 | 0.1 | 0.1 | 0 | 0 | 0 | 0 | 0 | 0 | 1.5 | 0 | 0 | 0 | 0 | 2.4 | 3300 |
| 19 | 0 | 0 | 0 | 0 | 0 | 0 | 0 | 0.1 | 0 | 0 | 0 | 0 | 0 | 1.5 | 0 | 0 | 0 | 2.4 | 3270 |
| 20 | 0 | 0 | 0 | 0 | 0 | 0 | 0 | 0 | 0 | 0 | 0 | 0 | 0 | 0 | 2 | 0 | 0 | 2.5 | 3250 |
| 21 | 0 | 0 | 0 | 0 | 0 | 0 | 0 | 0 | 0 | 0 | 0 | 0 | 0 | 0 | 0 | 2 | 0 | 2.7 | 3200 |
| 22 | 0 | 0.02 | 0 | 0.02 | 0 | 0.06 | 0 | 0 | 0 | 0 | 0 | 0 | 0 | 0 | 0 | 0 | 2 | 2.6 | 3220 |
| *23 | 0 | 0.02 | 0 | 0.02 | 0 | 0.06 | 0 | 0 | 2.5 | 0 | 0 | 0 | 0 | 0 | 0 | 0 | 0 | 3 | 2300 |

THE MARK OF "*" REFERS TO COMPARATIVE SAMPLES

MULTILAYER CERAMIC CAPACITOR AND METHOD FOR MANUFACTURING SAME

FIELD OF THE INVENTION

The present invention relates to a multilayer ceramic capacitor; and, more particularly, to a miniaturized large capacitance multilayer ceramic capacitor with an increased operating life and a method for manufacturing same, wherein the miniaturization and large capacitance are achieved by scaling down the thickness of the dielectric layers employed in the multilayer ceramic capacitor and stacking a greater number of the scaled-down dielectric layers.

BACKGROUND OF THE INVENTION

In general, as shown in FIG. 1, a multilayer ceramic capacitor 10 includes a ceramic body 12 having a pair of external electrodes 14A and 14B respectively formed at two opposite end portions thereof. The ceramic body 12 is fabricated by sintering a laminated body formed of alternately stacked dielectric layers 16 and internal electrodes 18. Each pair of neighboring internal electrodes 18 faces each other with a dielectric layer 16 intervened therebetween and is electrically coupled to different external electrodes 14A and 14B, respectively.

The dielectric layers 16 are made of a reduction resistive ceramic compound including, e.g., barium titanate (BT) as a major component and an oxide of rare-earth elements. The internal electrodes 18 are formed by sintering a conductive paste whose main component is, e.g., Ni metal powder.

The ceramic body 12 is produced by forming a chip-shaped laminated body with alternately stacked ceramic green sheets and internal electrode patterns, removing a binder off the chip-shaped laminated body, sintering the binder removed laminated body in a non-oxidative atmosphere at a high temperature ranging from 1200° C. to 1300° C., and finally re-oxidizing the sintered laminated body in an oxidative atmosphere.

Recent trend for ever more miniaturized and dense electric circuits demands for a further scaled-down multilayer ceramic capacitor with higher capacitance. Keeping up with such demand, there has been made an effort to fabricate thinner dielectric layers and to stack a greater number of the smaller-sized dielectric layers.

However, when the dielectric layers of the multilayer ceramic capacitor are thinned out, the electric field intensity per one layer increases and, thus, the operating life of the multilayer ceramic capacitor becomes shortened.

SUMMARY OF THE INVENTION

It is, therefore, a primary object of the present invention to provide a miniaturized large capacitance multilayer ceramic capacitor with a desired operating life and a method for manufacturing same, wherein the miniaturization and large capacitance of the multilayer ceramic capacitor are achieved by scaling down the thickness of the dielectric layers in the multilayer ceramic capacitor and stacking a greater number of the scaled-down dielectric layers.

In accordance with one aspect of the present invention, there is provided a multilayer ceramic capacitor formed by alternately stacking a plurality of dielectric layers and a multiplicity of internal electrodes, which are connected to a pair of external electrodes, wherein each of the dielectric layers is obtained from a dielectric ceramic compound composed of ceramic grains and a glass component connecting the ceramic grains and the glass component contains one or more additive elements selected from the group consisting of Mn, V, Cr, Mo, Fe, Ni, Cu and Co.

In accordance with another aspect of the present invention, there is provided a method for manufacturing a multilayer ceramic capacitor, including the steps of:

forming a ceramic slurry;

forming ceramic green sheets from the ceramic slurry;

printing internal electrode patterns on the ceramic green sheets;

generating a laminated body by stacking the ceramic green sheets provided with the internal electrode patterns printed thereon;

dicing the laminated body to thereby form chip-shaped ceramic bodies; and sintering the chip-shaped ceramic bodies, wherein the ceramic slurry includes a glass component containing one or more additive elements selected from the group consisting of Mn, V, Cr, Mo, Fe, Ni, Cu and Co.

BRIEF DESCRIPTION OF THE DRAWINGS

The above and other objects and features of the present invention will become apparent from the following description of preferred embodiments given in conjunction with the accompanying drawings, in which:

FIG. 3 presents a table including operating life values and dielectric constants of multilayer ceramic capacitors generated in accordance with a fabricating process of the present invention.

DETAILED DESCRIPTION OF THE PREFERRED EMBODIMENTS

Figure 1:
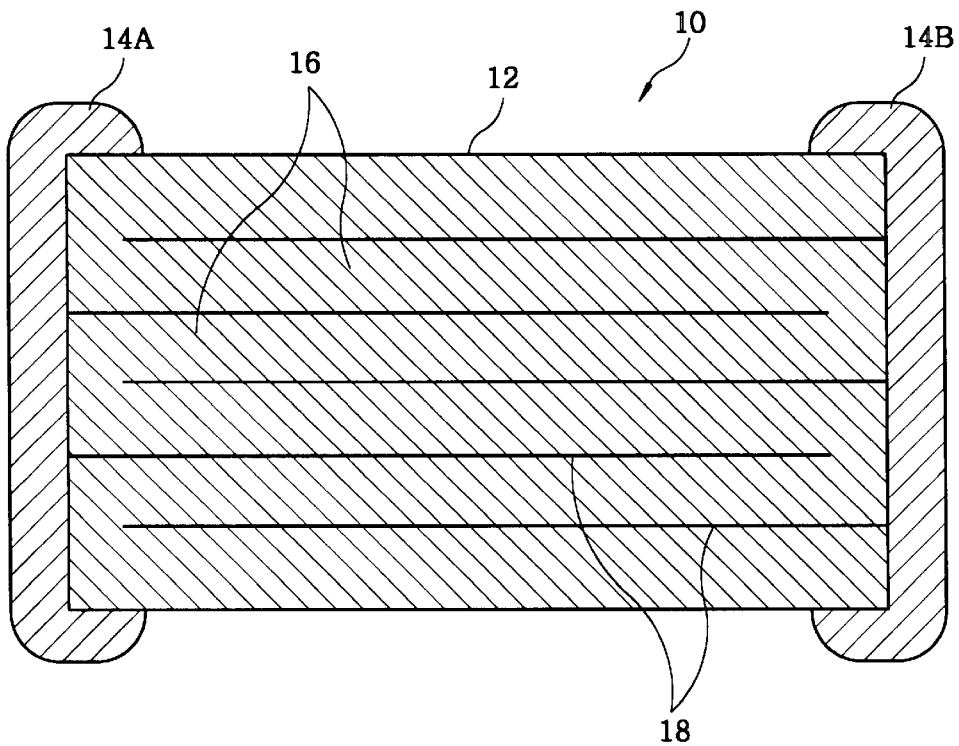
FIG. 1 illustrates a cross sectional view of a typical multilayer ceramic capacitor.

The preferred embodiments of the present invention will be described hereinbelow.

A multilayer ceramic capacitor in accordance with the present invention is fabricated by alternately stacking a plurality of dielectric layers and a multiplicity of internal electrodes, and making a pair of external electrodes connected to the multiplicity of internal electrodes, wherein the dielectric layers are obtained from a dielectric ceramic compound composed of ceramic grains and a glass component connecting the ceramic grains.

The glass component contains one or more additive elements selected from the group consisting of Mn, V, Cr, Mo, Fe, Ni, Cu and Co. The glass component is positioned in interfaces between the ceramic grains so as to fill the interfaces and the additive elements are included in the glass component filling the interfaces in a form of a solid solution. It is preferable that an amount of the additive elements contained in the glass component be in a range of 0.01 to 1.0 mol %. In this range, it is possible to obtain a multilayer ceramic capacitor with a desired operating life and a high dielectric constant.

Moreover, it is preferable that at least 20 wt % of an instrumental analytical value of the additive elements contained in the dielectric ceramic compound be positioned in interfaces between the ceramic grains. That is, the multilayer ceramic capacitor can obtain the desired operating life if an amount of the additive elements in the interfaces is equal to or more than 20 wt %. The instrumental analytical value is obtained from a peak strength measured by an equipment employing an energy distribution spectroscopy (EDS) in a transmission electron microscope (TEM).

The glass component can be a mixture composed of compounds that are fritted in a sintering process to thereby constitute glass frits. Therefore, the glass component can be oxides including as a main substance $Li_2O$, $SiO_2$ and MO, or $B_2O_3$, $SiO_2$ and MO, wherein M is one or more metal elements chosen from the group consisting of Ba, Sr, Ca, Mg and Zn. In addition to the above-mentioned materials, the glass component may be any glass constituting material.

Further, the glass component may contain a secondary phase of crystalloid. The term "secondary phase" used herein represents a reaction product of a main component and additives of the dielectric ceramic compound. If the glass component contains the secondary phase of crystalloid, the deterioration of the dielectric constant of the dielectric layer is reduced. Moreover, in case of using a base metal such as Ni, Cu or the like so as to form the internal electrodes of the multilayer ceramic capacitor, it is preferable that the glass component be composed of a reduction resistive compound since a sintering process for fabricating the multilayer ceramic capacitor is performed in a reductive atmosphere. In the sintering process of firing a chip-shaped laminated ceramic body to thereby form the multilayer ceramic capacitor, the laminated ceramic body may be re-oxidized in an oxidative atmosphere after having been sintered in a non-oxidative atmosphere.

The dielectric ceramic compound can include ceramic material of barium titanate or strontium titanate. Further, the dielectric ceramic compound may contain one or more rare-earth elements selected from the group consisting of Sc, Y, Gd, Dy, Ho, Er, Yb, Tm and Lu. Herein, the rare-earth elements can be included in the glass component filling the interfaces in a form of a solid solution. It is preferable that an amount of the rare-earth elements included in the glass component be equal to or less than 2.0 mol %. If an amount of the rare-earth elements is larger than 2.0 mol %, the dielectric constant of the multilayer ceramic capacitor may be deteriorated.

In addition, it should be appreciated that a major component of a conductive paste to be used in forming the internal electrodes can be Pd or Ag—Pd instead of Ni.

Hereinafter, an exemplary process of manufacturing a multilayer ceramic capacitor in accordance with the preferred embodiment of the present invention will be discussed in detail.

First of all, 0.961 part by mole of $BaCO_3$, 0.05 part by mole of MgO, 0.01 part by mole of SrO and 0.99 part by mole of $TiO_2$ were stirred for 15 hours with 2.5 liters of water and alumina balls in a pot mill to thereby form a source mixture.

Then, the source mixture was poured into a stainless-steel pot and dried at 150° C. for 4 hours by using an air heating desiccator. The dried source mixture was pulverized and then heated at about 1200° C. for 2 hours in the air in a tunnel furnace so as to obtain first basic component powder.

Further, $BaCO_3$ and $ZrO_2$ of the same molar amount were thoroughly mixed, dried, pulverized and finally heated at about 1250° C. for 2 hours in the air, thereby providing second basic component powder.

Thereafter, 1000 g of the basic component was obtained by mixing 98 parts by mole (976.28 g) of the first basic component powder and 2 parts by mole (23.85 g) of the second basic component powder.

Moreover, 1 part by mole of $Li_2O$, 80 parts by mole of $SiO_2$, 3.8 parts by mole of $BaCO_3$, 9.5 parts by mole of $CaCO_3$, 5.7 parts by mole of MgO, 0.1 part by mole of $MnO_2$ and 0.5 part by mole of $Sc_2O_3$ were well mixed and then 300 cc of alcohol was added to the resulting mixture. The alcohol added mixture was stirred for 10 hours with alumina balls in a polyethylene pot and then heated at 1000° C. for 2 hours in the air.

Then, the heated component was poured with 300 cc of water into an alumina pot, ground for 15 hours by the alumina balls, and dried at 150° C. for 4 hours, to thereby form first additive component powder.

Next, 100 parts by weight (1000 g) of the basic component and 2 parts by weight (20 g) of the first additive component were mixed with a second additive component, i.e., 0.1 part by weight (1 g) of $Sc_2O_3$ and $Al_2O_3$, respectively, which have an average diameter of 0.5 $\mu$m and whose purity is equal to or more than 99.0%. The resulting mixture of the basic component and the first and the second additive components was mixed again with 15 wt % of an organic binder and 50 wt % of water in a ball mill to thereby form a ceramic slurry, wherein the organic binder includes acrylic ester polymer, glycerin and a solution of condensed phosphate.

The ceramic slurry was formed into a molded sheet by using a reverse roll coater after undergoing through a vacuum deaerator for removing any air therefrom. Then the molded sheet was continuously coated on a polyester film and at the same time dried at 100° C., thereby forming square ceramic green sheets having a size of 10×10 cm and a thickness of about 5 $\mu$m.

10 g of nickel powder having an average diameter of 1.5 $\mu$m and 0.9 g of ethylcellulos were dissolved in 9.1 g of butyl carbonyl and stirred in a stirrer for 10 hours to form a conductive paste. Thereafter, the conductive paste was printed on one side of a ceramic green sheet to form internal electrode patterns through the use of a screen having 50 patterns of 14 mm×7 mm, and then the printed conductive paste was dried.

Subsequently, 11 ceramic green sheets on which the internal electrode patterns were printed were piled up with the internal electrode patterns facing upward, thereby forming a laminated body. Two corresponding internal electrode patterns provided on two neighboring ceramic green sheets were arranged in such a manner that they were shifted by about one-half of one pattern size lengthwise. The laminated body further included protective ceramic dummy sheets of 200 $\mu$m thickness formed on top and bottom of the laminated body, wherein the protective ceramic dummy sheets had no internal electrode patterns.

Then, the laminated body thus formed was vertically compressed with a load of 40 tons at about 50° C. Afterwards the pressed laminated body was diced so as to form 50 pieces of chip-shaped ceramic bodies, each having a size of about 3.2×1.6 mm.

Thereafter, a binder removing process was carried out by loading the chip-shaped ceramic bodies into a furnace capable of controlling an atmosphere therein and then the organic binder contained in the loaded ceramic bodies was removed by heating the furnace up to 600° C. at a heating rate of 100° C./h in the air.

Subsequently, the atmosphere of the furnace was altered to a reductive atmosphere by using process gases of $H_2$ (2 vol %)+$N_2$ (98 vol %). Then the binder-removed bodies were fired to obtain sintered ceramic bodies by increasing the temperature from 600° C. up to 1130° C. with a heating rate of 100° C./h and maintaining the highest temperature of 1130° C. for 3 hours.

In a following step, the furnace was cooled down to 600° C. at a cooling rate of 100° C./h and then the atmosphere of the furnace was changed into an oxidative atmosphere. The furnace was sustained for half an hour in the oxidative atmosphere at 600° C., thereby re-oxidizing the sintered ceramic bodies. The furnace was cooled down again to a room temperature to obtain sintered laminated bodies of the multilayer ceramic capacitor.

Finally, the conductive paste composed of Ni, glass frits and a vehicle was coated on two opposite sides of each sintered laminated body, wherein one end portion of each of the internal electrodes was exposed to a corresponding side of the two opposite sides of the sintered laminated body. The coated conductive paste is heat-treated at 550° C. in the air for 15 minutes so as to form Ni conductive layers. Then copper layers and Pb—Sn soldering layers were successively formed on top of the Ni conductive layers by using an electroless plating and an electroplating method, respectively, thereby obtaining a pair of external electrodes. As a result of the above processes, the multilayer ceramic capacitor illustrated in FIG. 1 was formed.

As shown in FIG. 1, the multilayer ceramic capacitor 10 comprises the ceramic body 12 having a pair of external electrodes 14A and 14B respectively formed at two opposite end portions thereof. Further, the ceramic body 12 is fabricated by sintering a laminated body formed of alternately stacking the dielectric layers 16 and the internal electrodes 18, wherein each pair of neighboring internal electrodes 18 faces each other with a dielectric layer intervened therebetween.

Referring to Sample No. 14 of Table 1 shown in FIG. 3, there are presented an operating life and a dielectric constant ($\epsilon$) of the multilayer ceramic capacitor generated in accordance with the above fabricating processes.

The operating life was obtained by measuring a breakdown time of the multilayer ceramic capacitor under the condition of a temperature of 170° C. and an applied voltage of 70 V. The values of the operating life in Table 1 of FIG. 3 were normalized values with respect to that of the operating life of Sample No. 1.

The dielectric constant ($\epsilon$) was computed based on a facing area of a pair of internal electrodes, a thickness of a dielectric layer positioned between the pair of internal electrodes and capacitance of the multilayer ceramic capacitor measured at a temperature of 20° C., a frequency of 1 kHz and an applied voltage of 1.0 V. Herein, it is preferable that the dielectric constant be equal to or more than 3000.

Through the use of the equipment employing the EDS in the TEM, there were measured peak strengths for 10 boundary points and 10 non-boundary points in a given region between the ceramic grains of the dielectric layer whose diameter is 10 nm, to thereby compute average peak strengths for the boundary points and the non-boundary points based on the measured peak strengths. In the above, the boundary points are positioned in the interfaces between the ceramic grains, and the non-boundary points are located in the remaining parts of the given region. From the above measurement, it was noticed that a ratio of the average peak strength for the boundary points and that for the non-boundary points of Sample No. 14 was equal to or larger than ⅔ and an amount of the additive element positioned in the interfaces between the ceramic grains of Sample No. 14 was equal to or more than 20 wt %. On the other hand, for the Comparative Sample No. 1, an amount of the additive element positioned in the interfaces was less than 20 wt %.

Then, the experimental results shown in Table 1 were obtained by executing the above experiment as replacing the additive element Mn with V, Cr, Mo, Fe, Ni, Cu or Co and the rare-earth element Sc with Y, Gd, Dy, Ho, Er, Yb, Tm or Lu, and adding an amount of each element depicted in Table 1 of FIG. 3. In Table 1 of FIG. 3, the mark of "*" represents Comparative Samples.

Figure 2:
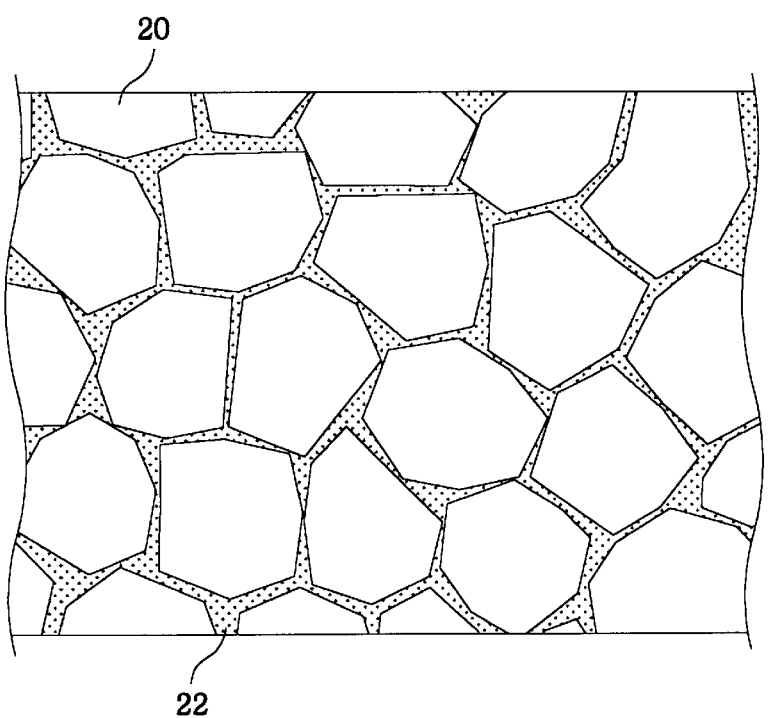
FIG. 2 is a partial cross sectional view of a dielectric layer of the multilayer ceramic capacitor.

Referring to FIG. 2, there is provided a partial cross sectional view of the dielectric layer 16 of the multilayer ceramic capacitor, which was observed by the TEM.

In FIG. 2, a reference numeral 20 represents ceramic grains, and interfaces including triple points between the ceramic grains 20 were filled with a glass component 22.

With reference to Table 1 of FIG. 3, it can be recognized that the operating life of the multilayer ceramic capacitor substantially increases in case the additive element and the rare-earth element are added compared with the other case in which the additive element and the rare-earth element are not added. Further, the same result was obtained in case of $B_2O_3$-$SiO_2$-MO being used as a boundary constituting component, wherein M can be Sr or Zn. Meanwhile, the same result was attained in case of $SrCO_3$ being used in lieu of $BaCO_3$ among ingredients of the first basic component.

In accordance with the present invention, the inventive multilayer ceramic capacitor can have a longer operating life and enhanced reliability than conventional multilayer ceramic capacitors since it uses the glass component employing the additive element or the rare-earth element to fill the interfaces between ceramic grains of the dielectric layers thereof.

Further, a re-oxidization characteristic of the glass component is improved since it includes the additive element or the rare-earth element therein, so that the operating life and the reliability of the inventive multilayer ceramic capacitor increase. The condition of employing the additive element or the rare-earth element can be controlled optimally because the additive element or the rare-earth element is uniformly distributed in the regions between the ceramic grains in a form of the solid solution.

While the present invention has been described with respect to the particular embodiments, it will be apparent to those skilled in the art that various changes and modifications may be made without departing from the spirit and scope of the invention as defined in the following claims.

What is claimed is:

1. A multilayer ceramic capacitor formed by alternately stacking a plurality of dielectric layers and a multiplicity of internal electrodes, which are connected to a pair of external electrodes, wherein each of the dielectric layers is obtained from a dielectric ceramic compound composed of ceramic grains and a glass component connecting the ceramic grains and the glass component contains one or more additive elements selected from the group consisting of Mn, V, Cr, Mo, Fe, Ni, Cu and Co.

2. The multilayer ceramic capacitor as recited in claim 1, wherein an amount of the additive elements in the dielectric ceramic compound is in a range of about 0.01 to about 1.0 mol %.

3. The multilayer ceramic capacitor as recited in claim 1, wherein the glass component is positioned in interfaces between the ceramic grains as coating the ceramic grains.

4. The multilayer ceramic capacitor as recited in claim 3, wherein at least 20 wt % of an instrumental analytical value of the additive elements is positioned in interfaces between the ceramic grains.

5. The multilayer ceramic capacitor as recited in claim 2, wherein the additive elements are included in the glass component in a form of a solid solution.

6. The multilayer ceramic capacitor as recited in claim 1, wherein the dielectric layers are formed from the dielectric ceramic compound of barium titanate or strontium titanate.

7. The multilayer ceramic capacitor as recited in claim 1, wherein the dielectric ceramic compound includes one or more rare-earth elements selected from the group consisting of Sc, Y, Gd, Dy, Ho, Er, Yb, Tm and Lu.

8. The multilayer ceramic capacitor as recited in claim 7, wherein the glass component contains the rare-earth elements in a form of a solid solution and an amount of the rare-earth elements is equal to or less than 2.0 mol %.

9. The multilayer ceramic capacitor as recited in claim 1, wherein the glass component contains $Li_2O\text{-}SiO_2\text{-}MO$ or $B_2O_3\text{-}SiO_2\text{-}MO$ as a major component, MO being one or more metal oxides selected from the group consisting of BaO, SrO, CaO, MgO and ZnO.

10. The multilayer ceramic capacitor as recited in claim 1, wherein the glass component contains a secondary phase of crystalloid.

11. The multilayer ceramic capacitor as recited in claim 1, wherein the glass component is composed of a reduction resistive compound and the internal electrodes are made of a base metal.

* * * * *